US 6,530,711 B2

(12) United States Patent
Menotti

(10) Patent No.: US 6,530,711 B2
(45) Date of Patent: Mar. 11, 2003

(54) BALL JOINT WITH SEALING SYSTEM INTEGRATED TO THE RETAINING RING

(75) Inventor: Fabio Menotti, Sao Paulo (BR)

(73) Assignee: Dana Corporation, Toledo, OH (US)

( * ) Notice: Subject to any disclaimer, the term of this patent is extended or adjusted under 35 U.S.C. 154(b) by 51 days.

(21) Appl. No.: 09/795,572

(22) Filed: Feb. 28, 2001

(65) Prior Publication Data

US 2001/0036385 A1 Nov. 1, 2001

(30) Foreign Application Priority Data

Feb. 28, 2000 (BR) ......................................... P10000638

(51) Int. Cl.⁷ ............................. F16C 11/06; B62D 7/16
(52) U.S. Cl. ....................................... 403/135; 277/635
(58) Field of Search ............................ 403/132, 134, 403/135, 50, 133; 277/634, 635

(56) References Cited

U.S. PATENT DOCUMENTS

| | | | | | |
|---|---|---|---|---|---|
| 3,027,182 | A | * | 3/1962 | Reuter | 403/134 |
| 3,273,923 | A | * | 9/1966 | Ulderup | 403/134 |
| 3,389,927 | A | * | 6/1968 | Herbenar | 403/134 |
| 5,066,159 | A | * | 11/1991 | Urbach | 403/134 |
| 5,653,545 | A | * | 8/1997 | Moormann et al. | 403/133 |

* cited by examiner

Primary Examiner—Lynne H. Browne
Assistant Examiner—Kenn Thompson
(74) Attorney, Agent, or Firm—Rader, Fishman & Grauer PLLC

(57) ABSTRACT

A ball joint for different applications in special car suspension is disclosed. The ball joint includes a pin (1) with a first end for fixing in a counterpart, and a second spherical end (2), that is encased in a bearing (3) of consequently spherical internal profile, that by its turn is mounted in the internal area of a housing (4), whose external area is intended for fixing in a second counterpart. The housing (4) is closed over a retaining ring (5), that by its turn presses the bearing (3) and the pin (1), in such a way as to prevent axial or radial moving between the parts, including the dismounting of the assembly, but allowing rotational and oscillatory movements required for the operation of the assembly. Further, the retaining ring (5) supports the external (6) and the internal (7) sealings, preferably vulcanized, both of the area between the retaining ring (5) and the housing (4) and of the area between the retaining ring (5) and the pin (1). In this area the part of the sealing next to the pin (1) is strained by a sealing ring (8) that produces the desired sealing effect between the parts.

8 Claims, 2 Drawing Sheets

BALL JOINT WITH SEALING SYSTEM INTEGRATED TO THE RETAINING RING

TECHNICAL FIELD

This invention refers to a ball joint intended for different applications, where it is required the connection between two distinct parts, but with relative movements controlled between both parts, particularly a car suspension.

BACKGROUND OF THE INVENTION

Ball joints are generally composed of a pin with a spherical end, which is housed in a bearing located inside a housing. Part of the pin and the external part of the housing is available for mounting and fixing in their respective counterparts, allowing then the rotation and oscillation between them, as shown in the German Patent DE 1 575 684. It is known the method of encasing the sphere of the pin in the bearing, that has an internal profile also spherical and the surface of which will serve as a sliding track for the pin. The bearing, by its turn, will be mounted in the housing through its opening, their profiles being coincident, guaranteeing the mounting condition. On the bearing will be mounted, still through the opening of the housing, a ring whose internal diameter will allow the passing of the pin's body, but not of its spherical part, what would lead to the dismounting of the assembly. The ring is typically pressed on the bearing, and that consequently will press the sphere of the pin during the closing operation of the assembly. This hinders the axial and radial movements between the components, but without hindering in this way the rotation and oscillation movements of the pin on the internal surface of the bearing.

In this special type of construction, the ring still supports the sealing parts, made of elastic material, and may be embodied inside them, whose technical standard is duly characterized by U.S. Pat. No. 5,066,159, or with its perimeter partially adhered to the sealing parts, characterized by the patent PI 9405521-2-A.

However, he sealing parts commonly used in ball joints, when exposed, are prone to ruptures, perforations and tearing by external elements, not only during the transport and the mounting but also during the use in its application, thereby subjecting the internal region to the penetration of impurities and contaminants, leading to the reduction of the ball joint life.

In the case of the ring being entirely covered by a layer of the sealing part material, as mentioned in previously identified U.S. Pat. No. 5,066,159, the existence of this layer between the bearing and the ring and between the closing rim and the ring will allow a certain undesired axial movement of the pieces, due to the elastic characteristics of this material. Further, it is known that in this model the facility in the damaging of the sealing parts, in the case of extreme oscillatory movement of the pin.

In the case where the ring has a perimeter partially adhered to the sealing parts, as mentioned in previously identified patent PI 9405221-2A, the sealing part is vulcanized in the internal lateral wall of the ring throughout its internal diameter and in an adjacent area of the upper part thereof. In principle, this construction impairs penetration of impurities and contaminants between the pin and the ring. But, due to the small dimensions of the closing rim on the ring, this construction does not efficiently accommodate a sealing layer and also an area of direct contact between the closing rim and the ring simultaneously. Accordingly, penetration of impurities and contaminants is not actually impaired, and may still allow an undesirable axial movement of the pieces, as the control of this movement is not effective. Besides, this construction has sealing efficiency only when the joint is constructed by utilizing a single bearing with a tab projecting upon the upper part of the housing. The sealing is carried on by the pressing of the tab between the sealing ring and the upper part of the housing.

SUMMARY OF THE INVENTION

The objective of the invention is to present a technical and economically viable solution for ball joints exposed to impurities and contaminants with need of sealing during its application, without restriction as to the type of bearing to be utilized. This may be accomplished through the use of a retaining ring whose perimeter is connected to two distinct sealing pieces: an external sealing, connected by vulcanization along the external diameter of the retaining ring, extending itself until the internal diameter of the housing to guarantee sealing between the housing and the retaining ring; and an internal sealing, connected also by vulcanization along the internal diameter, promoting a flexible strut for the pin in case of extreme moving, and part of the upper surface of the retaining ring, extending itself until the pin, with a profiled favorable to the flexibility required to the sealing part during the different situations of inclination of the pin, guaranteeing in all situations the sealing between the pin and the retaining ring. The mounting facility is maintained and the axial movement between the parts is thereupon perfectly controllable, without damaging any part of the assembly.

BRIEF DESCRIPTION OF THE DRAWINGS

The drawings show an example among the several possible executions of the invention.

The FIG. 1 shows the ball joint, according to this invention, in a partial longitudinal cross section, for the visualization of its constructional details.

Figure 1:
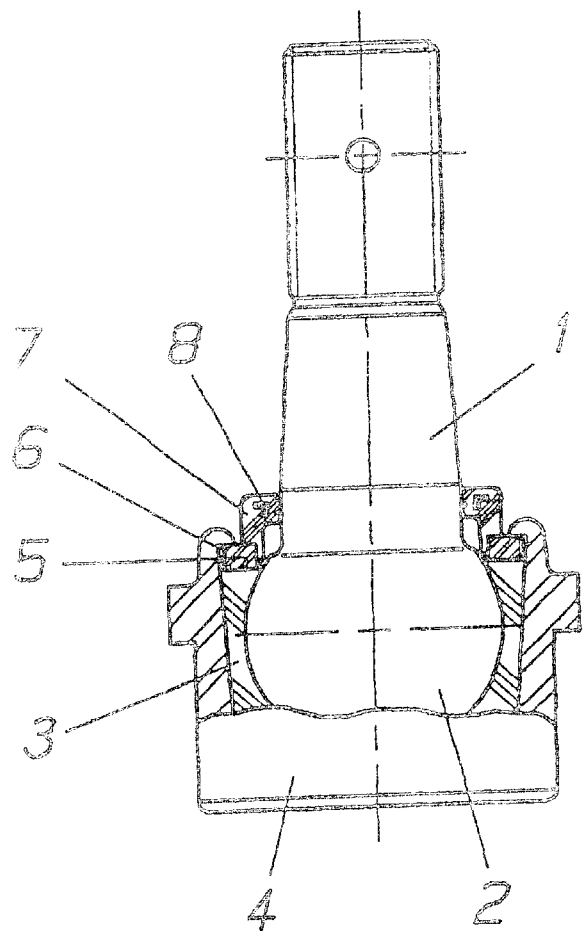
Figure 2:
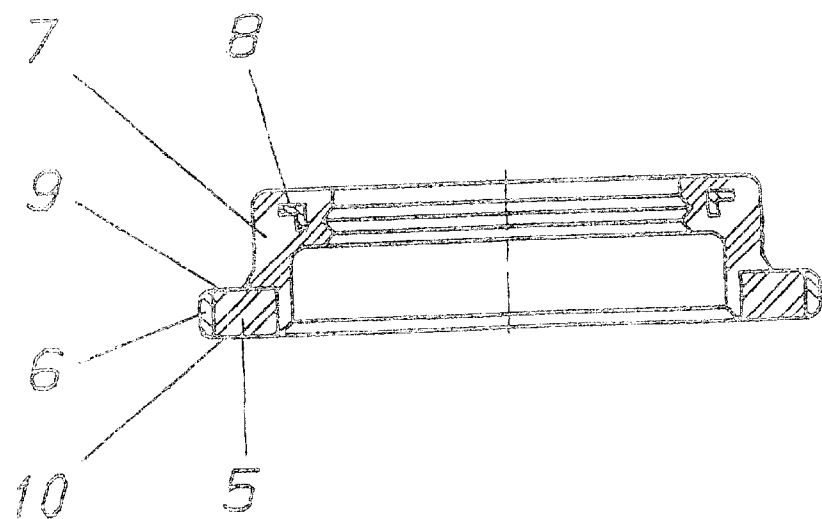

The FIG. 2 shows the retaining ring and the sealing parts that consitute the ball joint of the FIG. 1, in an enlarged longitudinal cross section.

Figure 3:
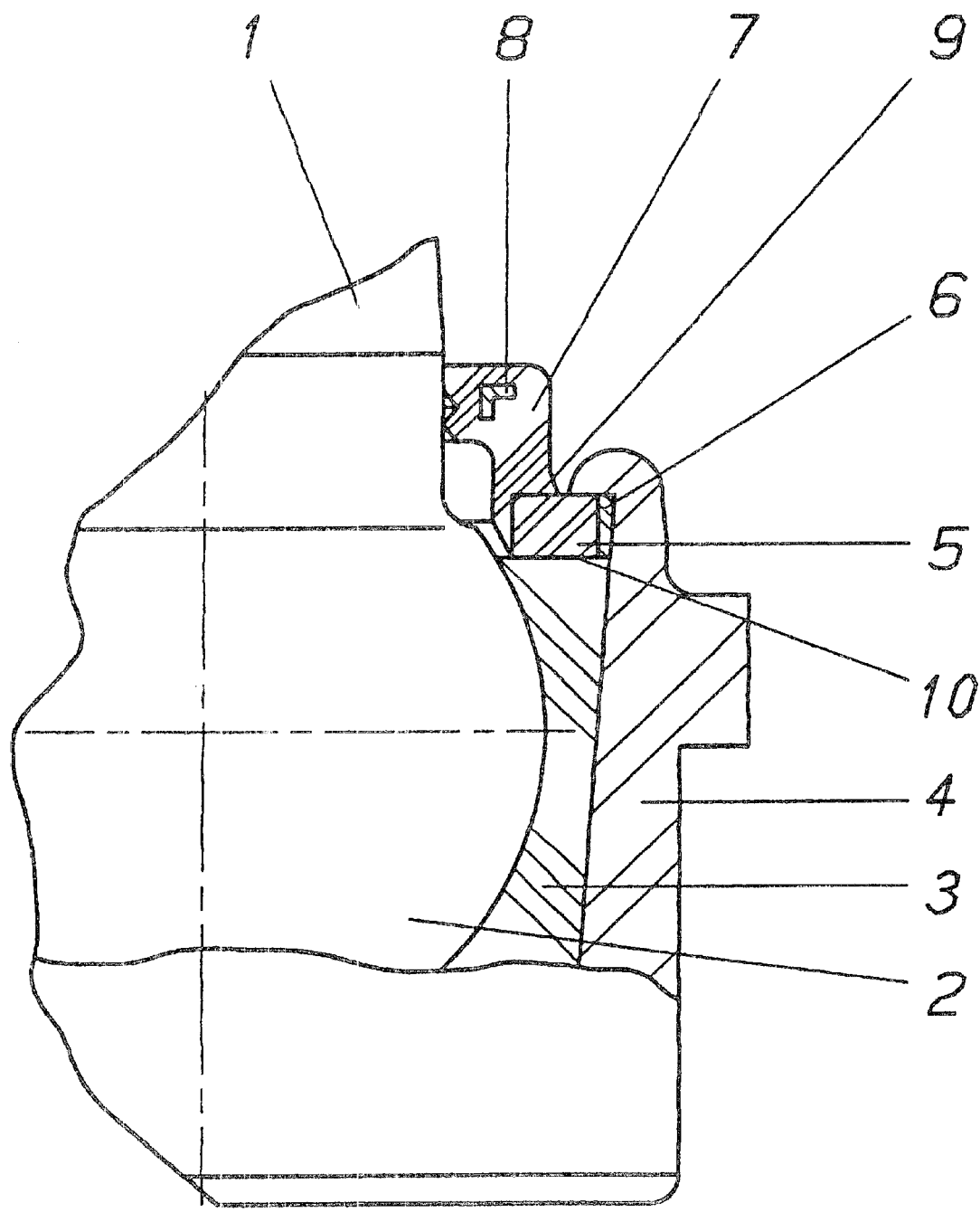

The FIG. 3 shows an enlarged detail of the FIG. 1.

DETAILED DESCRIPTION OF THE PREFERRED EMBODIMENT

Referring to FIGS. 1–3, a pin (1) of a ball joint presents a first end for fixing to a counterpart, and a second end with spherical format (2). The pin (1) is made, preferably, of metal. In the spherical end (2) of the pin (1), is fitted the bearing (3), that is made, preferably, of plastic, of coincident internal spherical profile, and that serves as a sliding track for the pin (1), allowing its movements around the center of the spherical end (2). The bearing (3) is encased through its external surface through the opening existent in the housing (4), that has a glass-like shape and that is made, preferably, of metal. The external part of the housing (4) is adapted to be fixed in a second counterpart. A retaining ring (5) is mounted through the opening of the housing (4) supporting on the bearing (3) all of its lower surface (10), which must be, if not free, only with a thin layer of residual rubber from the vulcanizing process, and must press the bearing (3) and the spherical end of the pin (20), preventing any undesirable movement between the parts in the axial and radial directions. The retaining ring (5)includes, preferably, metal with high mechanical properties and must, also, prevent dismounting of the assembly, as its internal diameter is smaller than the diameter of the spherical end (2) of the pin (1). These two functions are possible when they prevent the retaining ring (5) from moving through the opening of the housing (4), conforming it in a controlled manner over the retaining ring (5), in its upper surface (9), which must be, if not free, only with a thin layer of residual rubber from the vulcanizing process. The retaining ring (5) further sustains the external (6) and internal (7) sealings, made of elastic material, preferably of rubber, to provide the sealing property. The external sealing (6), connected to the retaining ring (5) throughout the perimeter of its external diameter, preferably through the vulcanization, extends itself until the internal part of the housing (4), accommodates itself to it and, therefore, prevents the penetration of impurities and contaminants in the area between the retaining ring (5) and the housing (4). However, the internal sealing (7), also connected to the retaining ring (5), throughout the perimeter of its internal diameter and of part of its upper surface (9), preferably through vulcanization, extends itself until the pin (1), having its profile intended to provide the flexibility required in order that the sealing property be maintained during the different situations of moving of the pin (1). The sealing ring (8), made preferably of metal, will strain the internal sealing (7) over the pin (1), producing the desired sealing effect, namely, preventing the penetration of impurities and contaminants in the region between the retaining ring (5) and the pin (1).

What is claimed is:

1. A ball joint having a sealing system integrated to a retaining ring, wherein a pin has a first end for fixing to a first counterpart and a second spherical end;

a bearing into which said second spherical end is encased, said bearing having a spherical internal profile that corresponds to said second spherical end;

a housing into which said bearing is enclosed, wherein said housing includes an opening through which said bearing is pressed by said retaining ring;

wherein said retaining ring has an internal diameter that is smaller than that of said second spherical end over which said housing is closed; and said sealing system further includes a separate external sealing and internal sealing;

wherein said external sealing is connected to said retaining ring and extending onto said housing; and wherein said internal sealing is connected to said retaining ring and extending onto said pin.

2. The ball joint of claim 1, wherein said external sealing is connected throughout the external perimeter of said retaining ring and extends onto until the internal wall of said housing.

3. The ball joint of claim 1, wherein a lower surface of said retaining ring directly contacts said bearing.

4. The ball joint of claim 1, wherein an upper surface of said retaining ring directly contacts said housing after said opening of said housing is closed over said retaining ring.

5. The ball joint of claim 1, further including a sealing ring that strains said internal sealing over said pin.

6. A ball joint comprising:

a pin having a first end for fixing to a first counterpart and a second spherical end;

a retaining ring;

a housing enclosing a bearing, wherein said housing includes an opening through which said bearing is pressed by direct contact with said retaining ring;

said bearing encasing said second spherical end of said pin and having a spherical internal profile that corresponds to said second spherical end;

a sealing system integrated to said retaining ring and having separate external and internal sealings;

said external sealing is connected throughout an external perimeter of said retaining ring and extends onto an internal wall of said housing;

said internal sealing is connected to said retaining ring and extends onto said pin; and said retaining ring has an internal diameter that is smaller than that of said second spherical end over which said housing is closed.

7. The ball joint of claim 6 wherein an upper surface of said retaining ring directly contacts the housing after said opening of said housing is closed over said retaining ring.

8. The ball joint of claim 6, further including a sealing ring within said internal sealing that strains said internal sealing over said pin.

\* \* \* \* \*